May 11, 1948.  C. H. RICHARDSON  2,441,168
CARRIAGE TRANSLATING MECHANISM
Filed Feb. 28, 1944   2 Sheets-Sheet 1
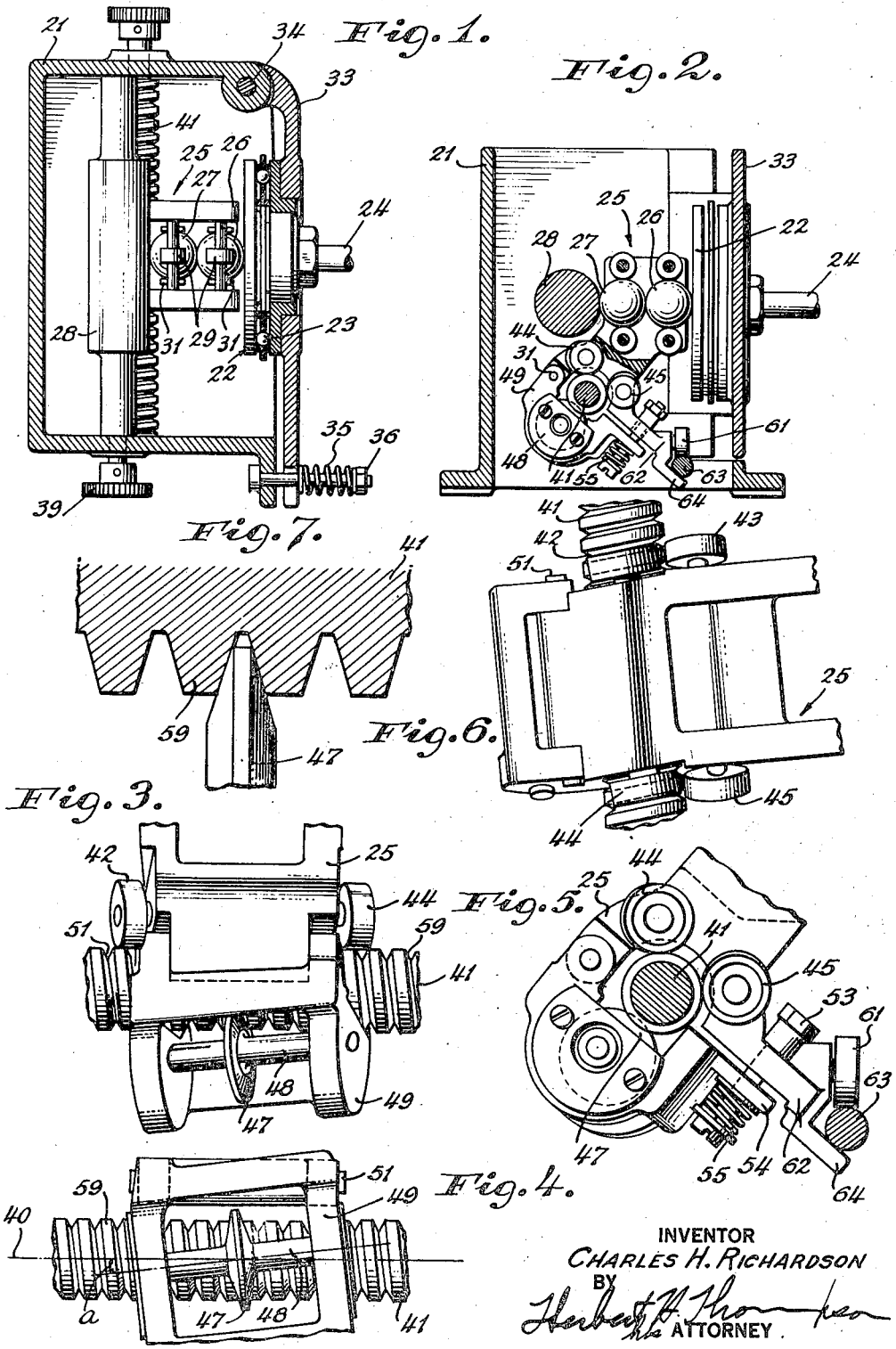
INVENTOR
CHARLES H. RICHARDSON
BY
Herbert H. Thompson
HIS ATTORNEY.

May 11, 1948.                C. H. RICHARDSON                2,441,168
                       CARRIAGE TRANSLATING MECHANISM
                          Filed Feb. 28, 1944           2 Sheets-Sheet 2
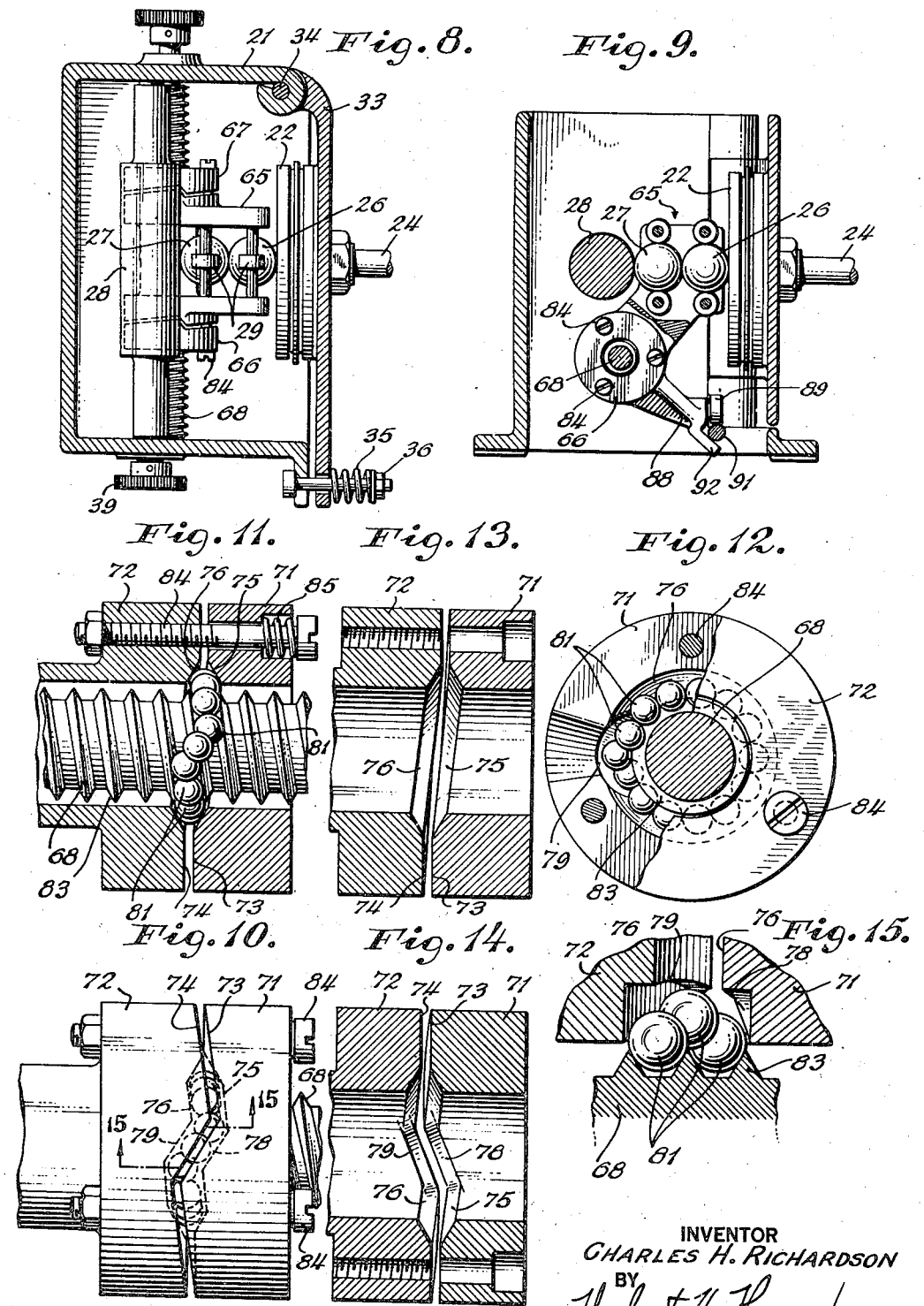
INVENTOR
CHARLES H. RICHARDSON
BY
Herbert H. Thompson
his ATTORNEY Patented May 11, 1948

2,441,168

UNITED STATES PATENT OFFICE 2,441,168

CARRIAGE TRANSLATING MECHANISM

Charles H. Richardson, Great Neck, N. Y., assignor to The Sperry Corporation, a corporation of Delaware Application February 28, 1944, Serial No. 524,306

16 Claims. (Cl. 74—424.8)

This invention relates, generally, to carriage translating mechanisms and particularly concerns apparatus for translating the carriage of a precision instrument by a lead screw and nut arrangement.

A major object of the invention is to reduce backlash between the lead screw and the carriage of a carriage translating mechanism.

Another object of the invention is to provide a carriage translating mechanism in which a lead screw serves as a rail to support the weight of the carriage.

A further object of the invention is to provide an anti-friction rolling contact between a translatable carriage and a lead screw for causing translatory motion of the carriage.

A still further object of the invention is to eliminate back-lash in an anti-friction carriage translating mechanism by providing a spring-pressed rolling contact element for engaging the thread of a lead screw.

Other objects and advantages of the invention will become apparent from the following specification taken in connection with the accompanying drawings wherein:

Fig. 1 is an elevation view partially in section of a variable-speed device having a carriage translating mechanism embodying the invention;

Fig. 2 is a vertical section of the variable speed device shown in Fig. 1;

Fig. 3 is an enlarged rear elevation view of the carriage translating mechanism shown in Figs. 1 and 2;

Fig. 4 is an enlarged bottom view of the carriage translating mechanism shown in Fig. 3;

Fig. 5 is an end view partially in section of the carriage translating mechanism shown in Fig. 3;

Fig. 6 is a plan view of the carriage translating mechanism as seen from the top of Fig. 5;

Fig. 7 is an enlarged section of the lead screw showing a wheel on the carriage in engagement with the thread of the screw;

Fig. 8 is an elevation view of variable speed device having a modified form of a carriage translating mechanism;

Fig. 9 is a vertical section of the variable-speed device shown in Fig. 8;

Fig. 10 is an enlarged elevation view of the carriage translating mechanism shown in Fig. 8;

Fig. 11 is a similar view with portions of the sleeve broken away for purposes of clearness;

Fig. 12 is an end view of the carriage translation mechanism shown in Fig. 10 with parts broken away for purposes of clearness;

Fig. 13 is a vertical section of the sleeve parts shown in Fig. 10;

Fig. 14 is a similar vertical section of the sleeve parts as seen from the opposite direction, and Fig. 15 is a sectional view of the carriage translating mechanism taken on the line 15—15 of Fig. 10.

According to the invention a trapezoidal lead screw is rotatable about an axis and a carriage has a sleeve surrounding the screw and supported thereon by anti-friction elements including a rotatable member engaging the thread of the lead screw to translate the carriage along said axis. Spring pressure is applied to the anti-friction elements to reduce play and eliminate back-lash between the carriage and the lead screw. A guide rail is engaged by an element on the carriage to prevent the rotation thereof about the screw.

In the form of the invention shown in Fig. 1, a conventional variable speed device having a casing 21 supports a disc 22, rotatable on bearings 23 and adapted to be driven by a shaft 24. A carriage designated, generally, at 25 carries a pair of balls 26 and 27 for transmitting motion from the disc 22 to an output cylinder 28. Suitable rollers 29, 29 and guide buttons 31, 31 may be interposed in the carriage for retaining the balls in alignment. One part 33 is pivoted to the casing 21 as by hinge 34 and is spring-pressed by spring 35 on bolt 36 to continuously apply pressure between the disc 22 and the cylinder 28.

The speed of the cylinder 28 is represented by output gear 39 and may be varied by translating the ball carriage 25 together with the balls 26 and 27 radially of the disc 22 along the axis of rotation of the output cylinder 28. For this purpose a lead screw 41 is journaled in the casing 21 for rotation about an axis extending parallel to the axis of rotation of the output cylinder 28. The ball carriage 25 is supported on the trapezoidal lead screw 41 by a plurality of rollers 42, 43, 44 and 45, arranged in pairs, as shown in Fig. 6, on opposite sides of the carriage 25 and spaced on the same side of the periphery of the lead screw 41. The rollers are arranged to span the cylindrical surfaces of adjacent screw threads, so that mutual rolling contact is provided therebetween, and the surface of screw 41 presents a substantially smooth, cylindrical, frictionless bearing surface for the rollers.

As shown in Figs. 2, 3 and 5, a rotatable member, in the form of wheel 47, is carried by a shaft 48 journaled in a bracket 49, which is pivoted, as by pin 51, to the main body of the ball carriage 25. The axis of the shaft 48, which is the axis of rotation of the wheel 47, is contained in a plane that passes through the contact point of the wheel 47 and is preferably disposed at an angle to axis 40 of the screw 41 corresponding to helix angle (a) of thread 59, as shown most clearly in Fig. 4.

A bolt 53 projects through the carriage 25 and a lip 54 on the bracket 49 to hold a compression spring 55 which acts to pull the bracket 49 toward the body of the carriage 25 thereby continuously pressing the wheel 47 into engagement with the sides of thread 59 of the lead screw 41, as shown in Fig. 7.

By this construction, the carriage 25 is supported on the screw 41 by the wheels 42, 43, 44 and 45 that are held in engagement with the crest of thread 59 by spring pressure exerted between the carriage 25 and the bracket 49 which acts as a lever to maintain the wheel 47 in engagement with the sides of the thread 59. As shown in the drawings the supporting wheels 42, 43, 44 and 45 are arranged to act on one side of the screw 41, whereas, the wheel 47 engages the screw 41 on the opposite side. The pressure of spring 55 thereby holds the supporting rollers in engagement with the truncated crest of the thread as well as the wheel 47 in engagement with the sides of the thread.

The provision of a rolling contact element for engaging the thread of the lead screw in this manner enables the lead screw to act as a rail for supporting the carriage as well as translating it. Translation of the carriage is effected by rotation of the lead screw 41. The supporting rollers and the wheel 47 are in rolling contact with the lead screw 41, so rotation of the screw causes these elements to also rotate. Since the wheel 47 engages the sides of the thread 59, it follows the thread and acts through shaft 48 and bracket 49 to translate the carriage 25 along the axis of rotation of the screw 41.

In order to prevent rotation of the screw from causing rotation of the carriage 25 about the axis of rotation of the screw, a guide roller 61 and a cooperating flange 64, carried by an arm 62, depending from the carriage 25, engages a guide rail 63, which runs parallel to the axis of rotation of the lead screw 41.

Arrangement of the supporting rollers on the truncated crest of the screw, as noted, and the rotatable element in engagement with the thread of the screw provides an anti-friction support for the ball carriage on the screw. In addition the spring pressure acting on the wheel 47 maintains it continuously in engagement with the sides of thread 59 to eliminate back-lash or play between the screw 41 and the carriage 25.

A modified form of the invention is shown for translating a ball carriage 65 in Fig. 8 which corresponds to the ball carriage 25 shown in Fig. 1. Other parts of the variable speed device, shown in Fig. 8, are designated by reference numbers corresponding to those shown in Fig. 1.

As shown in Fig. 8, carriage 65 is supported by two sleeve members 66 and 67 which are identical and include rotatable elements coupling the sleeve members 66 and 67 to lead screw 68 for supporting the carriage 65 on the lead screw and causing translation of the carriage upon rotation of the lead screw. The lead screw 68 is journaled in the casing 21 for rotation about an axis parallel to the desired direction of translation of the carriage 65 in moving radially of rotating disc 22.

Each of the sleeve members 66 and 67 consists of two parts, as shown in the drawings. The sleeve member 66, which is shown in detail in Figs. 10 to 15 inclusive, consists of two parts 71 and 72 having inner diameters suitable for surrounding the screw 68. The sleeve parts 71 and 72 are each formed with helically-shaped end surfaces 73 and 74, respectively, having beveled inner portions 75 and 76 which when placed together cooperate to form a helically-shaped groove or cage of a slightly larger diameter than the inner diameter of the sleeve parts 71 and 72. The ends of the helically-shaped beveled portions 75 and 76 of the end surfaces 73 and 74 are bridged or joined by arched portions 78 and 79, which, as shown most clearly in Figs. 10, 14, and 15, extend outwardly from the center of the sleeve, a distance at least equal to the root diameter of thread 81.

When the two surfaces 73 and 74 of the sleeve part 71 and 72 face each other they form a continuous helicoidal groove providing a helical shaped track for almost a complete revolution and connected by arched portion 78 and 79.

In order to provide a frictionless bearing support for the sleeve parts 71 and 72 on the lead screw 68, a plurality of balls 81, 81 are inserted to engage the thread 83 (Figs. 11 and 15) of the lead screw 68 and are retained in position by the helicoidal groove formed by end portions 73 and 74. The helical pitch of the end portions is the same as the pitch of the thread 83.

A plurality of bolts 84, 84 extend through the two sleeve parts 71 and 72 and carry compression springs 85 which continuously exert pressure on the two parts. In this manner the beveled portions of the end surfaces 71 and 72 are caused to form a continuous groove acting to press the balls 81 into engagement with the sides of the thread. During relative rotation between the sleeve parts 66 and 67, and the lead screw 68, the balls roll in the continuous helicoidal passage formed by the helically-shaped beveled portions 75 and 76 and their joining arched portions 78 and 79.

Considering the movement of one ball, as an example, relative rotation between sleeve parts and the screw causes the ball to travel along the thread of the screw for substantially one revolution. At the point where it reaches the end of the helically-shaped portion of the groove it enters the arched portion, moves outwardly from the root to the crest of the screw to pass over the thread 83 and begin another revolution. When a complete set of balls 81 is inserted they form a continuous rolling contact between the sleeve members 71 and 72 and the lead screw 68 about the entire periphery of the lead screw. Since the balls are constantly maintained, through the action of springs 85, in pressure engagement with the sides of the thread as well as the groove formed by the end portions 73 and 74, relative rotation between the lead screw and sleeve parts causes translatory movement between the lead screw and the sleeve parts as the balls move along the thread 83.

The spring pressure acting on the balls to engage them with the sides of the thread 83 eliminates, for all practical purposes, any back-lash or play in axial as well as radial directions with respect to the screw 68. In order to prevent rotation of the carriage 65 about the axis of screw 68, a depending arm 88 carries a guide roller 89 in engagement with the guide rail 91 that extends parallel to the lead screw 68. A flange 92 engages the opposite side of the guide rail 91.

In both forms of the carriage translating mechanism, rolling contact is provided between the carriage and translating lead screw. The carriage may be considered as a nut, the threads of which are formed by rolling contact members which engage the thread of the lead screw. In this manner the carriage may be supported on the lead screw without introducing undue friction. By having pressure continuously exerted on the balls, back-lash between the lead screw and the nut is eliminated. Since the lead screw may carry practically the entire load supported by its carriage, it is unnecessary to have the usual supporting rails to support the carriage in devices of this type. The only additional guide member required is a rail extending parallel to the lead screw for preventing rotation of the nut about the axis of the screw.

Both modifications of the apparatus provide a combined anti-friction support and translating mechanism for moving a carriage. Backlash is eliminated through action of pressure resiliency applied to rotatable members coupling the carriage to the lead screw.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A mechanism of the character described comprising a screw rotatable about an axis, a carriage translatable along said axis, and means for supporting said carriage on said screw including a rotatable member engaging the thread of said screw and forming a rolling contact therewith for translating said carriage upon turning of said screw, said means additionally providing peripheral thread contacting elements.

2. A mechanism of the character described comprising a screw rotatable about an axis, a carriage translatable along said axis, means for supporting said carriage on said screw including a rotatable member engaging the thread of said screw and forming a rolling contact therewith for translating said carriage upon turning of said screw, and resilient means exerting pressure to maintain said rotatable member in engagement with the sides of said thread to reduce play between said carriage and said screw.

3. A mechanism of the character described comprising a screw member, a nut member, said members being arranged for relative rotation about an axis and relative translation along said axis, and at least two rotatable elements, one element being interposed between said members for causing relative translation of said members upon relative rotation thereof and the other element being arranged for contact with the crest of said screw member.

4. A mechanism of the character described comprising a screw member, a nut member, said members being arranged for relative rotation about an axis and relative translation along said axis, a rotatable element carried by said nut member in engagement with the thread of said screw for causing relative translation of said members upon relative rotation thereof and at least another rotatable element carried by said nut member in engagement with the crest of said thread.

5. A mechanism of the character described comprising a screw rotatable about an axis, a carriage translatable along said axis, a lever pivotally supported on said carriage, a rotatable member carried by said lever in rolling contact with the thread of said screw for translating said carriage, and means connected to said lever for exerting pressure to maintain said rotatable member in engagement with the sides of said thread to reduce play between said carriage and said screw.

6. A mechanism of the character described, comprising a screw rotatable about an axis, a carriage translatable along said axis, a plurality of rollers rotatable on said carriage for engaging the crest of the thread of said screw to support said carriage thereon, and a member connected to said carriage for engaging the thread of said screw for translating said carriage upon turning of said screw.

7. A mechanism of the character described comprising a screw rotatable about an axis, a carriage translatable along said axis, a plurality of rollers rotatable on said carriage for engaging the crest of the thread of said screw to support said carriage thereon, a member carried by said carriage in a manner such that rotation of said screw causes translation of said carriage, and resilient means exerting pressure to maintain said member in engagement with the sides of said thread to reduce play between said carriage and said screw.

8. In a mechanism of the character described, a translatable carriage comprising a sleeve adapted to surround a screw, a plurality of rollers rotatably supported on said sleeve for engaging the crest of said screw, and a rotatable wheel carried by said sleeve for engaging the sides of said thread to cause translation of said sleeve upon rotation of the screw.

9. In a mechanism of the character described, a carriage comprising a sleeve adapted to surround a lead screw, a plurality of rollers rotatable about axes on said sleeve for engaging the crest of the thread of said screw, a rotatable member carried by said carriage for engaging the sides of said thread and forming a rolling contact therewith, and resilient means exerting pressure to maintain said member in engagement with the sides of said thread, said rollers and said member being arranged in a manner to restrain said sleeve from movement radially and axially of said screw.

10. A mechanism of the character described, comprising a screw rotatable about an axis, a carriage translatable along said axis and a plurality of balls interposed between said screw and said carriage in a manner such that rotation of said screw causes translation of said carriage, and resilient means for exerting pressure to maintain said balls in engagement with the sides of said thread to reduce play between said carriage and said screw.

11. A mechanism of the character described, comprising a threaded screw, a sleeve surrounding said screw and formed with a helical groove having its ends joined by an arch, a plurality of balls engaging the thread of said screw and retained by the grooved portion of said sleeve to form an anti-friction coupling for causing relative translation between said sleeve and said screw upon relative rotation thereof, said arch being arranged to permit movement of said balls over the crest of said thread to provide a continuous passage for said balls, and resilient means exerting pressure to maintain said balls in engagement with the sides of said thread to reduce play between said sleeve and said screw.

12. In a mechanism of the character described, a pair of sleeve parts having helically-shaped end surfaces connected by an arch extending outwardly from the center of said sleeve parts, and means including yielding connective devices for connecting said parts in a manner such that said end surfaces cooperate to form a continuous track for retaining a ball between the thread of a screw and said sleeve parts.

13. In a mechanism of the character described, a pair of sleeve parts having helically-shaped end surfaces connected by an arch extending outwardly from the center of said sleeve parts, and resilient means connecting said parts in a manner such that said end surfaces cooperate to form a continuous track for retaining a ball between the thread of a screw and said sleeve parts and exert pressure to maintain said ball in engagement with the sides of the thread to reduce play between said sleeve and screw.

14. In a mechanism of the character described, a first sleeve part having a helically-shaped end surface connected by an arch extending outwardly from the center of said sleeve part, and a second sleeve part having a similarly-shaped helical end surface connected by an arch, and means including resilient elements for connecting said parts in a manner such that said end surfaces cooperate to form a continuous slightly yielding track or ball race for holding balls between the thread of a screw and said sleeve parts.

15. In a mechanism of the character described, a first sleeve part having a helically-shaped end surface connected by an arch extending outwardly from the center of said sleeve part, a second sleeve part having a similarly-shaped helical end surface connected by an arch, and resilient means for connecting said parts in a manner such that said end surfaces cooperate to form a continuous track for holding balls between the thread of a screw and said sleeve parts and exert pressure to maintain said balls in engagement with the sides of said thread to reduce play between said sleeve parts and screw.

16. In a mechanism of the character described, the subcombination comprising two interiorly symmetrical ball retaining members, said members being so arranged interiorly that balls placed therein may traverse a helical path, and symmetrically arranged means including resilient elements for holding said members flexibly together and for facilitating proper path definition of said moving balls.

CHARLES H. RICHARDSON.

REFERENCES CITED

The following references are of record in the file of this patent:

UNITED STATES PATENTS

| Number | Name | Date |
| --- | --- | --- |
| 431,067 | Lieb | July 1, 1890 |
| 856,228 | Cromwell | June 11, 1907 |
| 1,606,127 | Kolb | Nov. 9, 1926 |
| 1,918,587 | Bryant | July 18, 1933 |
| 2,215,791 | Horowitz | Sept. 24, 1940 |
| 2,322,000 | Douglas | June 15, 1943 |

FOREIGN PATENTS

| Number | Country | Date |
| --- | --- | --- |
| 3,822 | Great Britain | Oct. 3, 1876 |
| 129,196 | Great Britain | July 10, 1919 |
| 526,735 | Great Britain | Sept. 24, 1940 |